United States Patent
Timmins et al.

(10) Patent No.: US 10,059,528 B2
(45) Date of Patent: Aug. 28, 2018

(54) CONCENTRIC SHAFT SPLIT TIMING SCREW SYSTEM

(71) Applicant: LIGHTHOUSE INSTRUMENTS, LLC., Charlottesville, VA (US)

(72) Inventors: Michael A. Timmins, Charlottesville, VA (US); Warren Griffith, Charlottesville, VA (US); Roy Hughes, Palmyra, VA (US)

(73) Assignee: LIGHTHOUSE INSTRUMENTS, LLC., Charlottesville, VA (US)

( * ) Notice: Subject to any disclaimer, the term of this patent is extended or adjusted under 35 U.S.C. 154(b) by 0 days.

(21) Appl. No.: 15/391,443

(22) Filed: Dec. 27, 2016

(65) Prior Publication Data
US 2017/0183165 A1    Jun. 29, 2017

Related U.S. Application Data

(60) Provisional application No. 62/272,374, filed on Dec. 29, 2015.

(51) Int. Cl.
*B65G 33/04* (2006.01)
*B65G 47/30* (2006.01)

(52) U.S. Cl.
CPC ............ *B65G 33/04* (2013.01); *B65G 47/30* (2013.01)

(58) Field of Classification Search
CPC ................................ B65G 33/04; B65G 33/34
USPC ......................................................... 406/59
See application file for complete search history.

(56) References Cited

U.S. PATENT DOCUMENTS

| | | | | |
|---|---|---|---|---|
| 2,279,201 A * | 4/1942 | Kozak | .................... | B65G 33/32 198/666 |
| 2,899,042 A * | 8/1959 | Wiseman | ............... | B65G 33/32 198/666 |
| 3,115,276 A | 12/1963 | Johanningmeier | | |
| 3,197,075 A | 7/1965 | Hansen | | |
| 4,099,621 A * | 7/1978 | Dullinger | ............... | B65G 33/04 209/522 |
| 4,194,844 A * | 3/1980 | Walling | .................... | B01F 3/18 198/548 |

(Continued)

FOREIGN PATENT DOCUMENTS

EP    1365978 B1    3/2007

OTHER PUBLICATIONS

Schwartz et al., "Making the Right Shaft Connections", Machine Design, available at <http://www.machinedesign.com/motioncontrol/makingrightshaftconnections>, Aug. 1, 2000.

*Primary Examiner* — Joseph A Dillon, Jr.
(74) *Attorney, Agent, or Firm* — Greenblum & Bernstein, P.L.C.

(57) ABSTRACT

A split shaft screw system includes a screw configured to convey an article along a movement path. The screw includes a plurality of threads, each thread having a crest, a root and a pair of sidewalls, wherein the root and pair of sidewalls are configured to capture the article. Provided are a first screw segment connected to a first drive shaft configured to be driven by a first motor, and a second screw segment immediately adjacent to the first screw segment and connected to a second drive shaft concentric to the first drive shaft, the second drive shaft configured to be driven by a second motor independently of the driving of the first screw segment.

16 Claims, 8 Drawing Sheets

(56) References Cited

U.S. PATENT DOCUMENTS

| | | | | |
|---|---|---|---|---|
| 4,566,583 A * | 1/1986 | Schneider | | B65G 33/04 198/459.4 |
| 5,279,501 A | 1/1994 | Shelley | | |
| 5,697,489 A * | 12/1997 | Deonarine | | B65G 33/04 198/464.4 |
| 5,715,976 A * | 2/1998 | Kautz | | B65G 33/32 198/672 |
| 5,909,815 A * | 6/1999 | Kato | | B07B 13/04 209/651 |
| 6,253,809 B1 | 7/2001 | Paradies | | |
| 6,460,686 B1 | 10/2002 | Giometti et al. | | |
| 6,722,490 B1 * | 4/2004 | Bass | | A22C 21/0053 198/657 |
| 7,067,323 B2 | 6/2006 | Veale et al. | | |
| 7,284,577 B2 * | 10/2007 | Yoneda | | B65G 33/04 141/129 |
| 8,490,778 B2 | 7/2013 | Wolf et al. | | |
| 2003/0172990 A1 * | 9/2003 | Hiramoto | | B65G 33/04 141/313 |
| 2006/0191591 A1 * | 8/2006 | Yoneda | | B65G 33/04 141/129 |
| 2009/0173601 A1 * | 7/2009 | Tyer | | B65G 33/18 198/676 |
| 2010/0000843 A1 * | 1/2010 | Nishikawa | | B65G 33/04 198/657 |
| 2010/0326793 A1 * | 12/2010 | Seger | | B65G 33/04 198/461.2 |
| 2013/0240329 A1 * | 9/2013 | Brechling | | B23Q 7/002 198/676 |
| 2014/0069780 A1 * | 3/2014 | Iba | | B61B 13/125 198/750.1 |
| 2015/0291364 A1 | 10/2015 | Nishikawa et al. | | |
| 2016/0039549 A1 * | 2/2016 | Trebbi | | B65B 21/04 53/168 |
| 2017/0101272 A1 * | 4/2017 | Cherubini | | B65G 33/04 |
| 2017/0137228 A1 * | 5/2017 | Kyotani | | B65G 35/00 |
| 2017/0145314 A1 * | 5/2017 | Parkinson | | B65G 33/14 |

* cited by examiner

CONCENTRIC SHAFT SPLIT TIMING SCREW SYSTEM

1. CROSS REFERENCE TO RELATED APPLICATIONS

The present application claims the benefit of U.S. Provisional Application No. 62/272,374 filed on Dec. 29, 2015, the disclosure of which is expressly incorporated by reference herein in its entirety.

2. FIELD OF THE DISCLOSURE

The present application relates to a concentric shaft split timing screw system, and more particularly relates to a system for use in a machine such as a vial headspace inspection machine used for high speed determination of gas composition in conveyable articles such as pharmaceutical vials.

3. BACKGROUND INFORMATION

An example of a vial headspace inspection machine is described in U.S. Pat. No. 7,067,323, the disclosure of which is expressly incorporated by reference herein in its entirety. FIG. 9 shows a vial headspace inspection machine having a pre-inspection starwheel 22 which hands off cylindrically-shaped containers such as sealed generally optically transparent sample containers such as vials 14 to an inspection starwheel 28 for testing in an inspection region 18. Each of these starwheels 22, 28 includes pockets 23 to house vials 14, 30. Although sample vials 14 are handed off from pre-inspection starwheel 22 to inspection starwheel 28, a plurality of reference vials 30 (used a reference to continuously calibrate inspection sensors, to adapt for any changes in measurement conditions when analyzing the sample vials 14) are semi-permanently affixed to the inspection starwheel 28 (i.e., they are not handed off but rather continuously rotate with the inspection starwheel). As such, when feeding the pre-inspection starwheel 22 with sample vials 14, it is necessary to time such feeding so as to avoid introducing a sample vial 14 into the pocket 23 of pre-inspection starwheel 22, which otherwise would then cause the sample vial collide (or otherwise interfere) with a reference vial 30 already stored in a pocket 23 of the inspection starwheel 28.

Timing screw mechanisms are commonly used in vial headspace inspection machines to provide a way to control the position and speed when feeding vials 14 to coincide with pocket 23 locations of a pre-inspection starwheel 22 to facilitate loading of the starwheel pockets with the vials. FIGS. 1-3 show a related art timing screw mechanism 120 which includes a rotating timing screw 100. When used in vial headspace inspection machines, in order to prevent a sample vial 14 from colliding with a reference vial 30 already stored in a pocket 23 of the inspection starwheel 28, the screw 100 must pause its motion, e.g., for two vials every ½ turn of the pre-inspection starwheel 22 or equivalently every sixteen pockets.

In some vial headspace inspection machines, moving the starwheels 22, 28 as quickly as possible must be balanced by attempting to allow each vial 14, 30 to spend as much time being inspected in the inspection zone 18 to ensure the most accurate measurement possible. As such, vials 14 are fed and packed onto the inspection starwheel 30 as close as possible to each other. Accurate feed timing of the vials 14 thus becomes necessary in order to avoid unwanted collisions, jams and the like.

A drawback of the single timing screw 100 shown in FIGS. 1-3 is that it limits how closely vials 14 can be packed onto the starwheel 28. This is because if the vials 14 are too close to each other, when the screw tries to stop turning the last vial still remaining on the screw (i.e., the downstream-most vial) will interfere with the motion of the pre-inspection starwheel 22. To attempt to avoid this issue, the diameter of the screw 100 is increased at the very end of the screw in the form of a flare 102, thereby pushing the vial 14 into the pocket 23 of the pre-inspection starwheel 22, while leaving enough room so there is no interference with the stationary vial 14 behind it. Providing this flare 102 does not completely fix the issue and at the same time adds a complicated motion to the vials 14, which can lead to instability in the transport from the screw 100 to the pre-inspection starwheel 22.

Some known multiple screw systems include two separate screws positioned end to end with aligned axes of rotation. These screws are driven by motors at opposite ends of the system with a central support. This central support requires there to be a gap between the two screws, which can result in unstable handoff of containers at high speeds.

SUMMARY OF THE DISCLOSURE

A non-limiting feature of the disclosure provides a split shaft screw system including a screw configured to convey an article along a movement path, the screw including a plurality of threads, each thread having a crest, a root and a pair of sidewalls, wherein the root and pair of sidewalls are configured to capture the article, a first screw segment connected to a first drive shaft configured to be driven by a first motor, and a second screw segment immediately adjacent to the first screw segment and connected to a second drive shaft concentric to the first drive shaft, the second drive shaft configured to be driven by a second motor independently of the driving of the first screw segment.

The first screw segment may be positioned upstream of the second screw segment along the movement path, and the first drive shaft may be rotatable within the second drive shaft. Also provided may be a frame configured to hold both ends of the screw, wherein the first motor and second motor are affixed to the frame at the same end of the screw. Also, the first motor and second motor may be affixed the frame at a downstream end of the screw.

Additionally, the second screw segment may abut against the first screw segment. A thickness of the thread crests on the first screw segment may increase downstream along the movement path, and a thickness of the thread crests on the second screw may be constant along the movement path. Also, the first and second motors may be servo motors. Also provided may be at least one composite plane bearing positioned between the first drive shaft and second drive shaft.

They system may further include a frame configured to hold both ends of the screw, a first shaft connector mounted to the frame and operably connected to the first motor, a first key affixed to an end of the first drive shaft and configured to connect with the first shaft connector in a single position in a rotation direction of the first drive shaft, a second shaft connector mounted to the frame and operably connected to the second motor, and a second key affixed to an end of the second drive shaft and configured to connect with the second shaft connector in a single position in a rotation direction of the second drive shaft.

Another non-limiting feature of the disclosure provides a method for conveying an article along a movement path using a screw having at least two screw segments which are independently drivable by a respective at least two concentric drive shafts, the screw further having a plurality of threads, each thread having a crest, a root and a pair of sidewalls, the method including capturing the article between the root and pair of sidewalls, conveying the article by rotatably driving the at least two screw segments together at the same rate, and conveying the article by rotatably driving a single one of the at least two segments while the other of the at least two segments is slowed or stopped.

The method may also include rotating one of the at least two concentric drive shafts within another of the at least two concentric drive shafts. The method may further include supporting both ends of the screw, and driving the at least two concentric drive shafts by a respective at least two motors, wherein the at least two motors are affixed to a frame at the same end of the screw. The method may additionally include affixing the at least two motors to the frame at a same downstream end of the screw.

The method may yet still include abutting the at least two screw segments against each other. The method may also include increasing a thickness of the threads on one of the at least two screw segments downstream along the movement path, maintaining as constant a thickness of the threads on another of at least two screw segments along the movement path.

The method may additionally include introducing the article into a rotatable starwheel housing at a downstream end of the screw. Also, the introducing may further include providing for one or more unfilled starwheel housings between articles introduced into the rotatable starwheel, by the conveying the article by rotatably driving a single one of the at least two segments while the other of the at least two segments remains stopped.

Additionally, the method may include providing a frame configured to hold both ends of the screw, providing at least two shaft connectors mounted to the frame and operably connected to a respective at least two motors, connecting a first key to an end of one of the at least two drive shafts to a respective shaft connector of at least two shaft connectors, the first key connectable in only a single position in a rotation direction of the screw, and connecting a second key to an end of another of the at least two drive shafts to a respective shaft connector of at least two shaft connectors, the second key connectable in only a single position in a rotation direction of the screw.

The method may further include providing at least one composite plane bearing between drive shafts of the at least two concentric drive shafts. The method may additionally include, after the conveying the article by rotatably driving a single one of the at least two segments while the other of the at least two segments is slowed or stopped, resuming conveying the article by rotatably driving the at least two screw segments together at the same rate.

Other exemplary embodiments and advantages of the present disclosure may be ascertained by reviewing the present disclosure and the accompanying drawings, and the above description should not be considered to limit the scope of the present invention.

BRIEF DESCRIPTION OF THE DRAWINGS

The novel features which are characteristic of the systems, both as to structure and method of operation thereof, together with further objects and advantages thereof, will be understood from the following description, considered in connection with the accompanying drawings, in which a presently preferred embodiment of the system is illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein.

DETAILED DESCRIPTION

Figure 1:
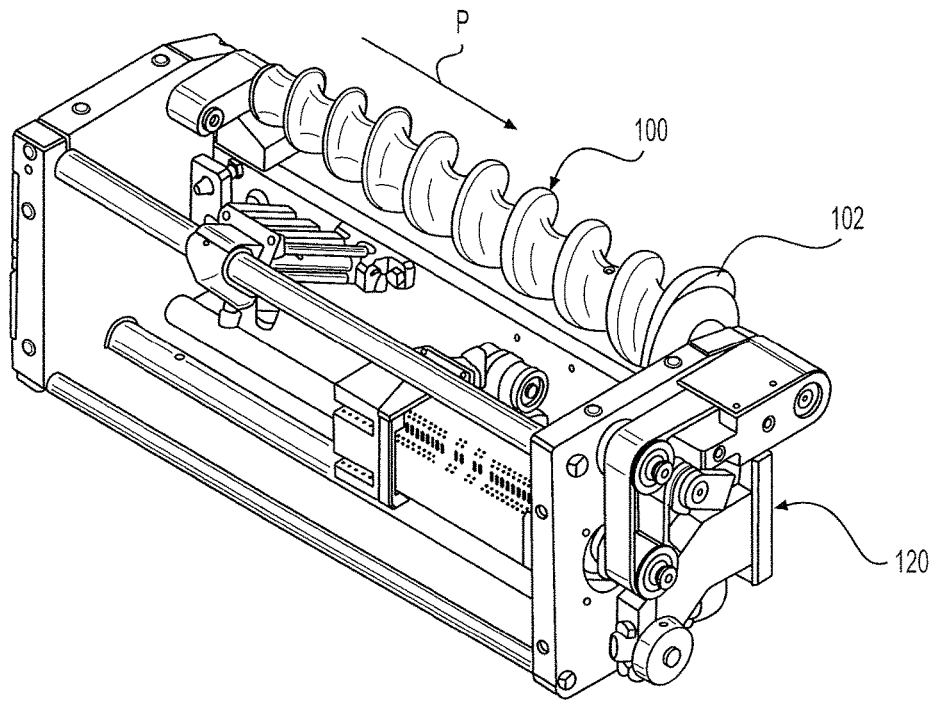
FIG. 1 shows a perspective view of a related art timing screw system.
Figure 2:
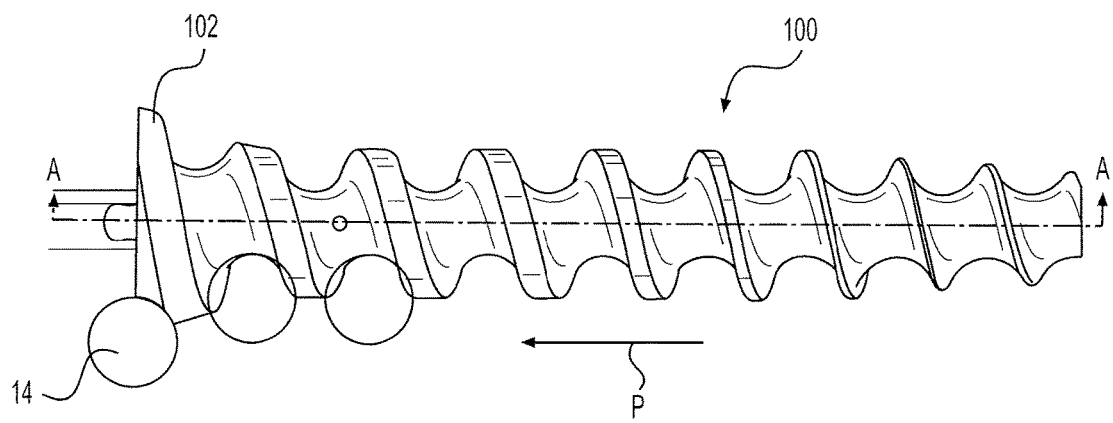
FIG. 2 shows a side view of a related art timing screw.
Figure 3:
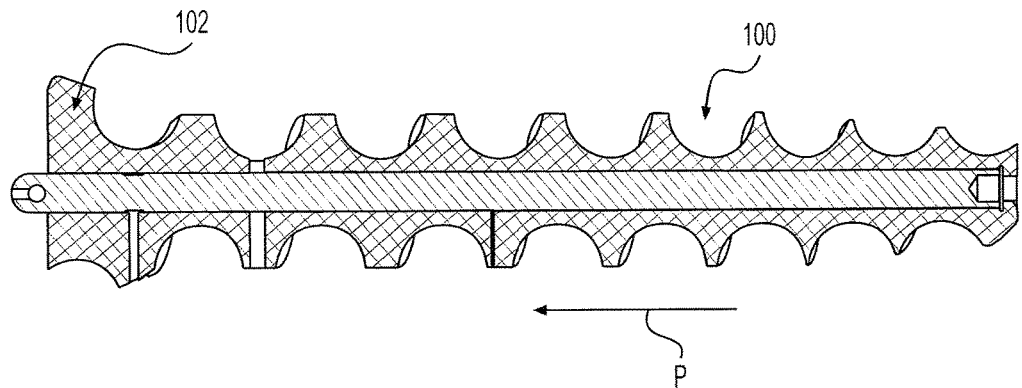
FIG. 3 shows a side cross-sectional view of the related art timing screw, taken along the lines A-A of FIG. 2.
Figure 4:
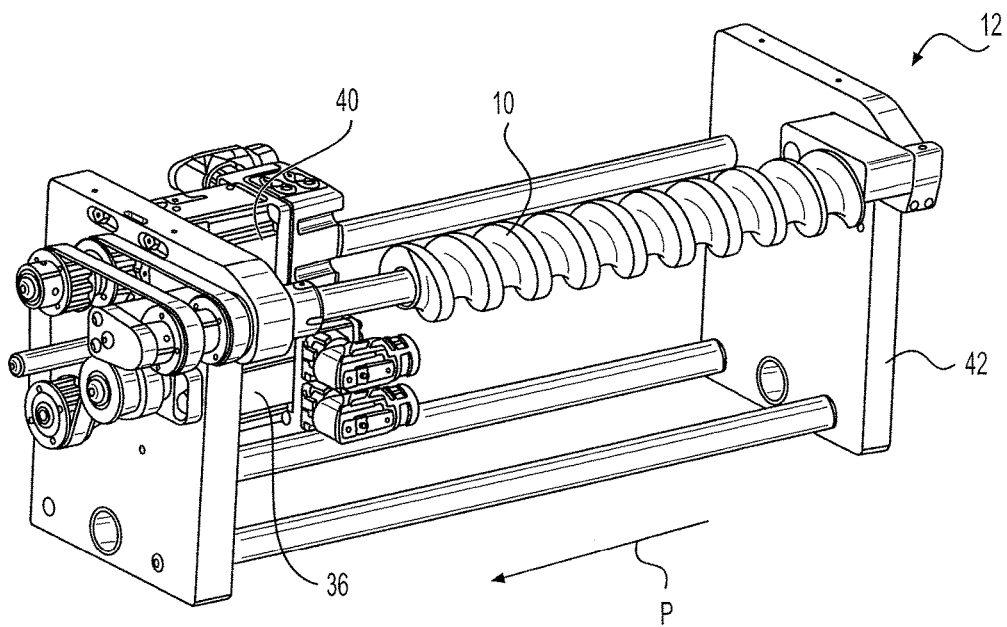
FIG. 4 shows a perspective view of an exemplary timing screw system according to an aspect of the present disclosure.
Figure 5:
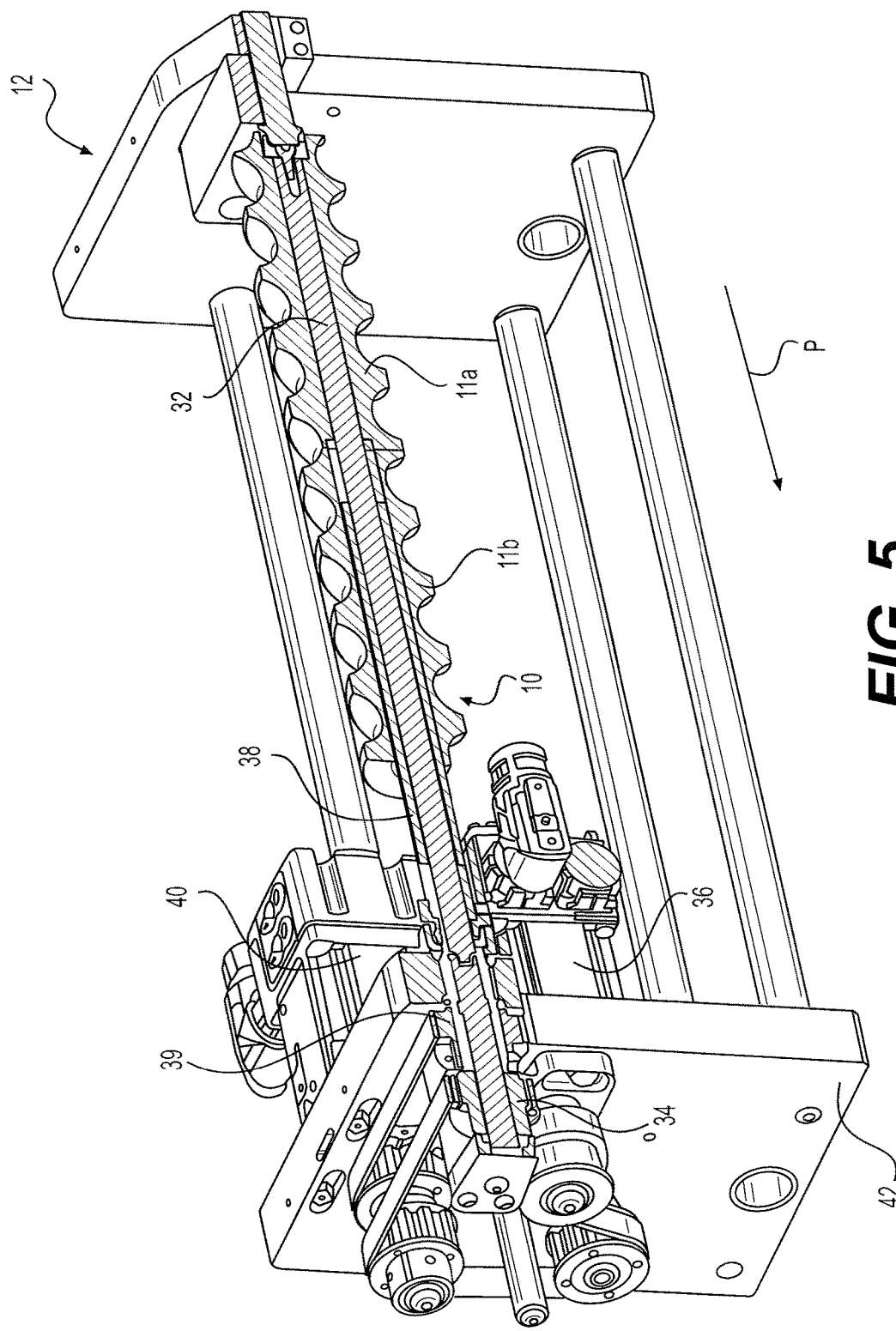
FIG. 5 shows a cross-sectional view of the timing screw and shaft shown in FIG. 4, according to an aspect of the present disclosure.

In the following description, the various embodiments of the present disclosure will be described with respect to the enclosed drawings. As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description is taken with the drawings making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

Referring to the FIGURES wherein like characters represent like elements, FIGS. 4-10 show a concentric shaft split timing screw system 12 according to an aspect of the disclosure. The system 12 includes a screw 10 which includes a plurality of threads T, each of which has a crest C, a root R and a pair of sidewalls S. The root R and the pair of sidewalls S are configured to capture a vial 14 for transport from an upstream direction to a downstream direction along movement path P. It is noted that "upstream" and "downstream" are described in relation to the movement of vials 14 along movement the path P. Also, while "vial" is used herein, it is appreciated that the present invention can be used with any conveyable article. Additionally, the vials 14 may contain, e.g., pharmaceutical, food, beverage and consumer electronics products therein, which may be in solid, liquid or powderous form (e.g., lyophilized form), and which are stored therein under controlled conditions (e.g., in a vacuum, with nitrogen backfill, etc.). Also the vials 14 may be completely gaseous, i.e., the entire vial contents may be headspace.

The screw 10 is split into two segments, namely, an upstream segment 11a and a downstream segment 11b. As shown in, e.g., FIGS. 5 and 7, the upstream segment 11a includes a rotatable inner shaft 32 connected to an inner shaft connector 34 which is operably connected to an inner shaft motor 36, which allows the upstream segment to rotate. The downstream segment 11b includes a rotatable outer shaft 38 connected to outer shaft connector 39 which is operably connected to an outer shaft motor 40, which allows the downstream segment to rotate independently of the upstream segment 11a. The motors 36, 40 are connectable to one or more computer controllers which can independently control the actuation of the motors. The motors 36, 40 may be stepper motors or any other type of suitable mechanism to impart motive force to the segments 11a, 11b. It is also noted that alternatively, the upstream segment 11a can be connected to the outer shaft 38, and the downstream segment 11b can be connected to the inner shaft 32. The motors 36, 40, screw 10, shafts 32, 38, inner shaft connector 34 and outer shaft connector are all mountable to a frame 42, which supports the screw at opposite ends thereof.

Figure 7:
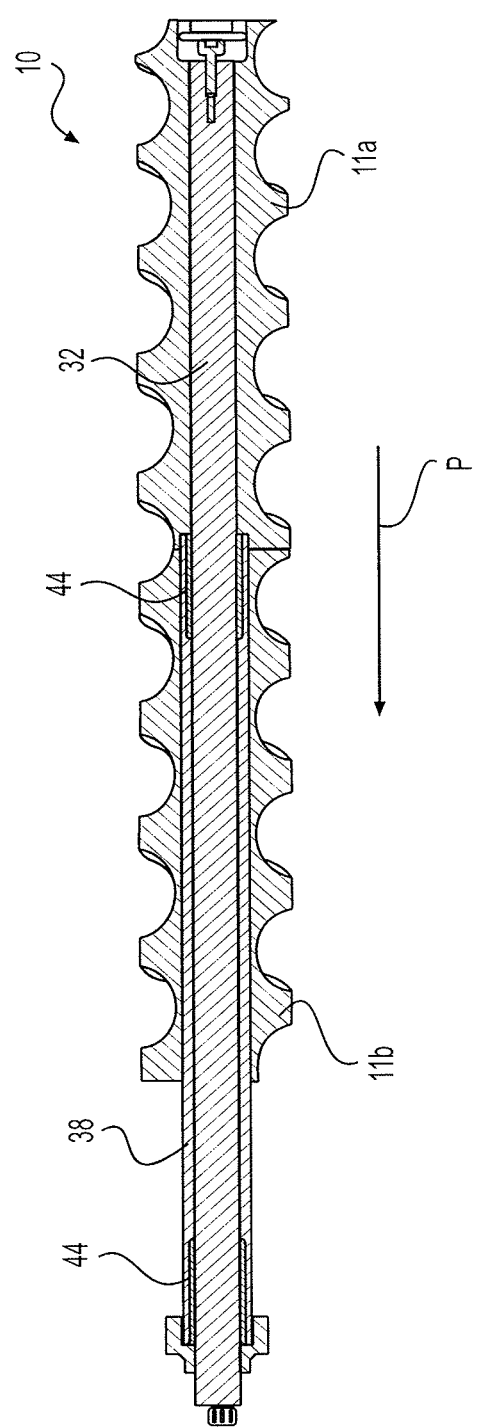
FIG. 7 shows a cross-sectional view of the timing screw and shaft shown in FIG. 6, according to an aspect of the present disclosure.
Figure 9:
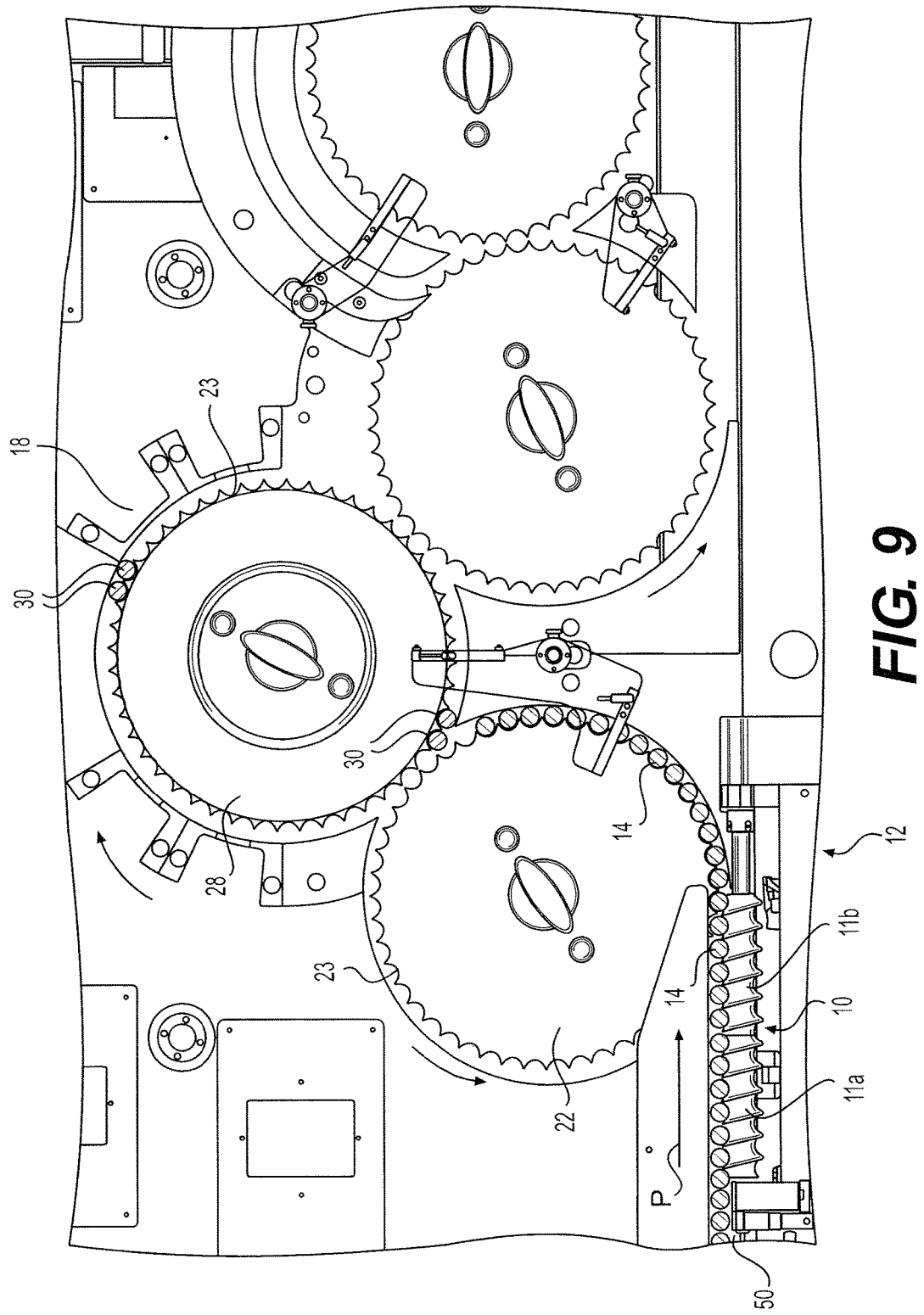
FIG. 9 shows a first schematic plan view of a an exemplary timing screw system, according to an aspect of the present disclosure in use with a vial headspace inspection machine.
Figure 10:
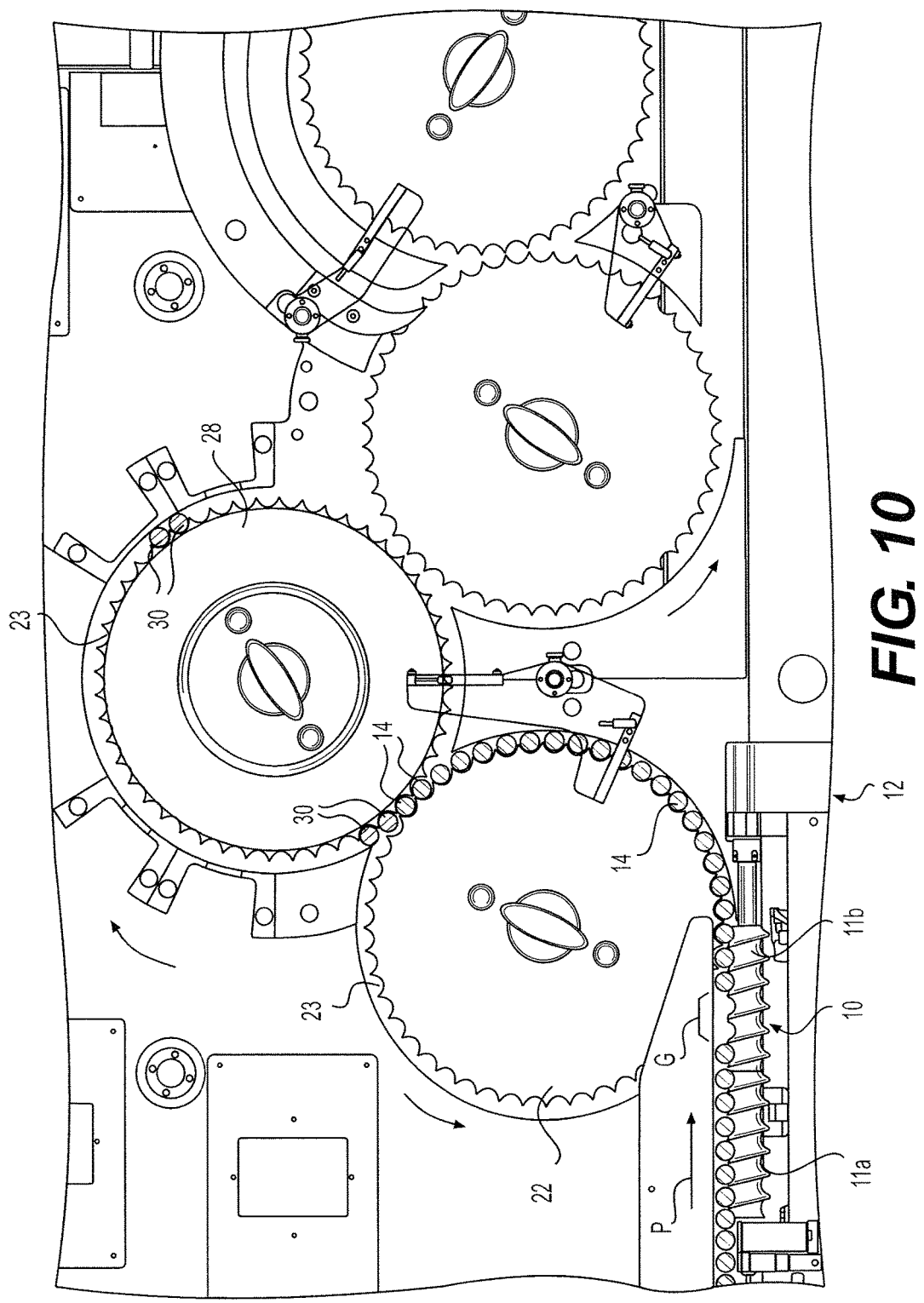
FIG. 10 shows a second schematic plan view of a an exemplary timing screw system, according to an aspect of the present disclosure in use with a vial headspace inspection machine

Further, in order to conserve space, the inner shaft 32 is coaxially housed within the outer shaft 38, which also allows the motors 36, 40 to be mounted to the same side of the frame 42 (either the upstream side or downstream side), which allows both screw segments 11a, 11b to be driven from the same side of the frame. This arrangement conserves even more space and allows for improved clearance at the upstream end of the system 12, which helps to facilitate loading of smaller vials 14 into the screw at the upstream end, as shown in FIGS. 9-10. The coaxial arrangement of the shafts 32, 38 also omits the need to have a structural support between the screw segments 11a, 11b, so that they can be immediately adjacent to each other or even abut each other. As shown in FIG. 7, the profile of the shafts 32, 38 in the thickness direction can be reduced by providing one or more plane bearings 44, which can be made of a composite material. These bearings 44 facilitate low friction rotational motion between the shafts 32, 38 when the screw segments 11a, 11b are rotating at speeds different from each other. These plane bearings 44 have a much smaller thickness than conventional ball bearings or rotating cylinder bearings.

The system 12 of the present disclosure may be used with vials and articles of different sizes because the screws of different thread T size and/or pitch may be used, by easily exchanging screws in the frame 42 (without changing the frame or other structural components). Also, since at least two screw segments 11a, 11b are used in the system, when inserting the screw 10 in the frame 42, it is necessary to align the split thread T from each screw segment 11a, 11b so that the vials 14 can be conveyed smoothly from the upstream segment 11a to the downstream segment 11b. While the drawings show two screw segments 11a, 11b, it is appreciated by those skilled in the art that more than two screw segments (as well as more than two motors 36, 40, shafts 32, 38, and shaft connectors 34, 36) may be employed in the system 12, depending on the desired application.

It is also noted that, although the drawings show the screw segments 11a, 11b being approximately the same length (such that "handoff" between the downstream segment 11a and the upstream segment 11b occurs approximately midway along the screw), due to the absence of a central support between the screw segments 11a, 11b, the screw segments can be different lengths without having to change the frame 42 or shaft connectors 34, 36 (resulting in the handoff between the downstream segment 11a and the upstream segment 11b being at different points along the length of the screw), so long as the overall distance requirements within the frame is satisfied. In an aspect of the disclosure, the split between the screw segments 11a, 11b occurs at a position which is between roots R on the side of the screw 10 closest to the vials 14 and at a rotational position of the screw where a plane perpendicular to the screw axis and passing through the axis of rotation of the pre-inspection starwheel 22 intersects the center of a pre-inspection starwheel pocket 23.

Figure 8:
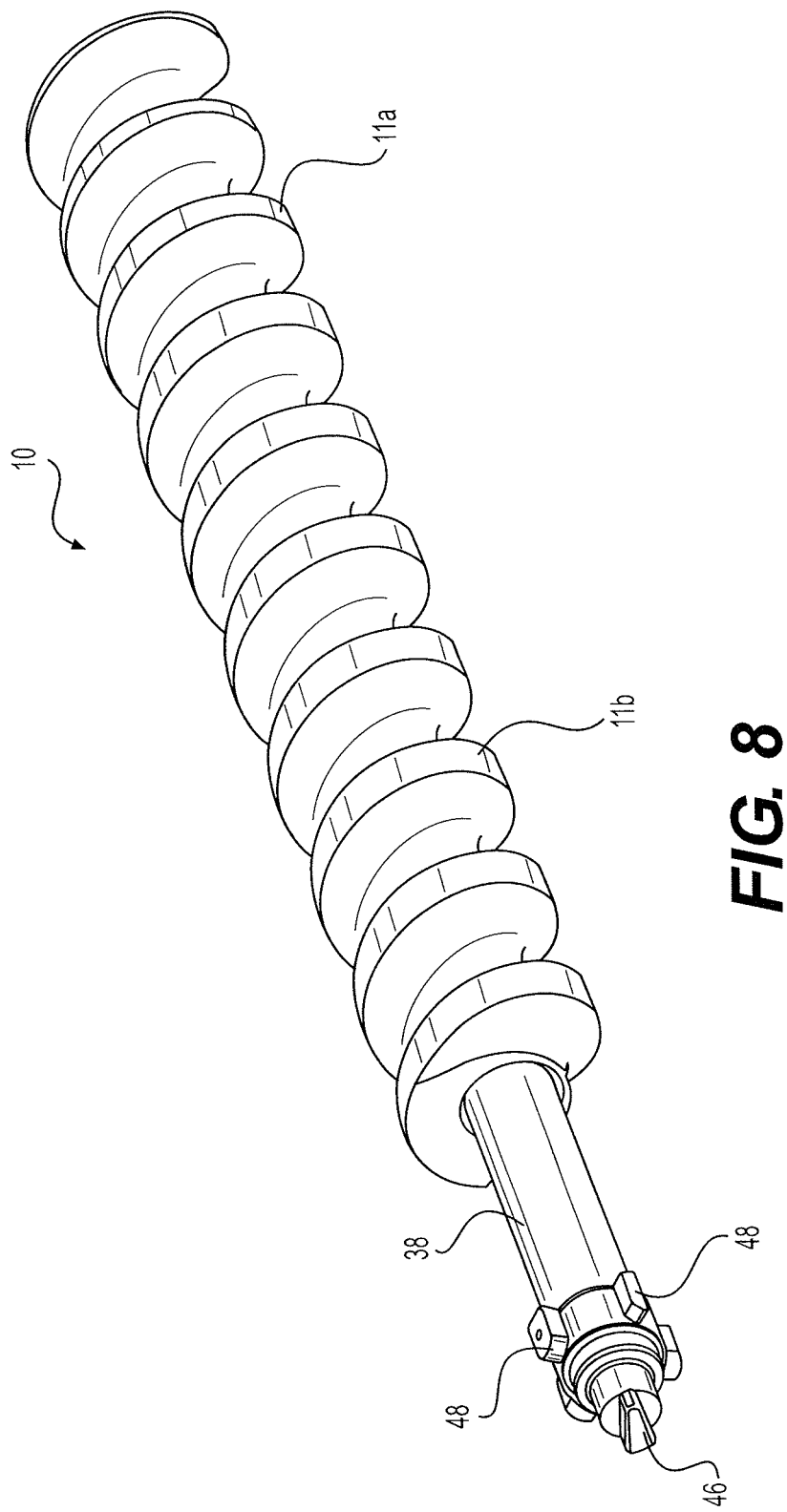
FIG. 8 shows a perspective view of a timing screw and shaft illustrating a mechanism for connecting the shaft to drives, according to an aspect of the present disclosure.

As shown in FIG. 8, in order to facilitate the above-noted alignment of the screw segments 11a, 11b when installing the screw 10 into the frame 42, the inner shaft 32 includes a wedge-shaped key 46 which fits in a complimentary wedge-shaped groove in the inner shaft connector 34 in only a single rotational position (i.e., a single position from among positions in a circumferential direction about the axis of rotation of the screw 10). Further the outer shaft 38 includes a plurality of differently-dimensioned block-shaped keys 48 which fit in complimentary block-shaped grooves in the outer shaft connector 39 in only a single rotational position (i.e., a single position from among positions in a circumferential direction about the axis of rotation of the screw 10). It is appreciated that in addition to or as an alternative to wedge and block shapes, other key and groove arrangements, as well as other alignable configurations, may be employed in either or both of the outer shaft and inner shaft connection configurations.

Figure 6:
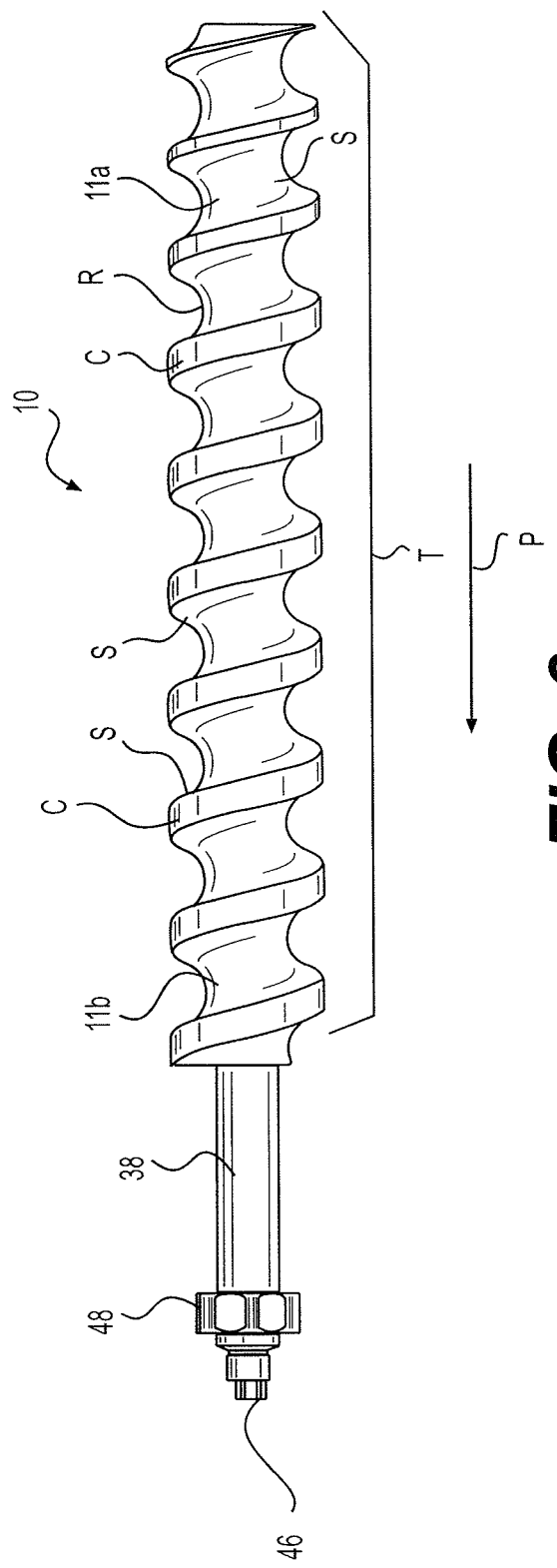
FIG. 6 shows a side view of an exemplary timing screw and shaft according to an aspect of the present disclosure.

As shown in FIGS. 6-8, in accordance with a feature of the disclosure provides for increasing the widths (i.e., thickness in the axial direction of the shaft) of the crest C of the threads T of the upstream segment 11a in the movement path P direction, while the maintaining generally constant widths (i.e., thickness in the axial direction of the shaft) of the thread crests of the threads of the downstream segment 11b. As shown in FIGS. 9-10, vials 14 are typically presented to the upstream end of the screw 10 via a conveyor such that the vials enter the screw with little or no spacing between them; however, the spacing between the starwheel pockets 23 is generally greater than the spacing between the vials before they are fed to the screw 10. Thus, the increased widths of the crest C of the threads T of the upstream segment 11a result in the vials 14 being increasingly spaced apart as they traverse the length of the screw 10 in the movement path direction P, so that the distance between the vials can match the spacing of the starwheel pockets 23 before the vials 14 are fed to the starwheel, which allows for more consistent control of vials during the stopping and starting of the upstream screw segment 11a, which introduces voids into the flow of containers to the starwheel, as further described below.

Operation of the system 10 is described hereinbelow with reference to FIGS. 9-10. In the vial headspace inspection machine, sample vials 14 are conveyed along a conveyor in the movement path direction P to the upstream end of the screw 10, which rotates and feeds the sample vials along the movement path to the pre-inspection starwheel 22. The pre-inspection starwheel 22 then hands off the sample vials 14 to the inspection starwheel 28 for testing. Since the reference vials 30 are semi-permanently affixed to the inspection starwheel 28 (i.e., they are not handed off but rather continuously rotate with the inspection starwheel), there must be a pause in feeding the sample vial 14 into the pocket 23 of pre-inspection starwheel 22 (i.e., a void, or gap G, in the form of one or more empty pockets 23 of the pre-inspection starwheel 22), so that the sample vial does not collide or otherwise interfere with a reference vial 30 already stored in a pocket 23 of the inspection starwheel 28.

To introduce such a void, the rotation of the upstream screw segment 11a is paused or slowed, while the downstream screw segment 11b continues to rotate at a speed synchronous with the motion of the pre-inspection starwheel 22, as shown in FIG. 10. Once the downstream screw segment has performed the required number of rotations corresponding to the number of voids G required to be introduced into the flow of sample vials, the rotation of the upstream screw segment 11a is resumed and the rotational speed thereof is again brought to match the rotational speed of the downstream screw segment 11b.

With such a configuration, since only the upstream segment 11a of the screw 10 is slowed or stopped to create the void G, the sample vials 14 can be reliably and smoothly handed off to the pre-inspection starwheel 22, and therefore the possibility of interference of the screw 10 with the pre-inspection starwheel 22 is virtually eliminated. Such a configuration provides a smoother and more reliable transfer from the screw 10 to the pre-inspection starwheel 22, since there is no longer any need to accelerate a sample vial 14 at the downstream end of the screw towards the pre-inspection starwheel 22. Thus, a flare 102 does not need to be provided (i.e., all threads of the screw 10 may be of a uniform height). As an example and as shown in FIGS. 9-10, the sample vial 14 which is second from the downstream end of the screw 10 is already partially engaged with the pre-inspection starwheel 22 as the downstream-most sample vial 14 leaves the screw.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGURES are to be regarded as illustrative rather than restrictive.

Accordingly, the present disclosure provides various systems, servers, methods, media, and programs. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the invention has been described with reference to specific embodiments, those skilled in the art will understand that various changes may be made and equivalents may be substituted for elements thereof without departing from the true spirit and scope of the invention. While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the invention. Furthermore, the features of various implementing embodiments may be combined to form further embodiments of the invention.

What is claimed is:

1. A split shaft screw system comprising:
   a guide;
   a screw configured to convey an article along a movement path and against the guide, the screw comprising:
      a plurality of threads, each thread having a crest, a root and a pair of sidewalls, wherein the root and pair of sidewalls are configured to capture the article;
      a first screw segment connected to a first drive shaft configured to be driven by a first motor; and
      a second screw segment immediately adjacent to the first screw segment and connected to a second drive shaft concentric to the first drive shaft, the second drive shaft configured to be driven by a second motor independently of the driving of the first screw segment; and
   a frame configured to hold both ends of the screw, wherein the first motor and second motor are affixed to the frame at a same downstream end of the screw.

2. The split shaft screw system according to claim 1, wherein:
   the first screw segment is positioned upstream of the second screw segment along the movement path; and
   the first drive shaft is rotatable within the second drive shaft.

3. The split shaft screw system according to claim 1, wherein the second screw segment abuts against the first screw segment.

4. The split shaft screw system according to claim 1, wherein:
   a thickness of the thread crests on the first screw segment increases downstream along the movement path; and
   a thickness of the thread crests on the second screw are constant along the movement path.

5. The split shaft screw system according to claim 1, wherein the first and second motors are servo motors.

6. A split shaft screw system comprising:
   a guide;
   a screw configured to convey an article along a movement path and against the guide, the screw comprising:
      a plurality of threads, each thread having a crest, a root and a pair of sidewalls, wherein the root and pair of sidewalls are configured to capture the article;
      a first screw segment connected to a first drive shaft configured to be driven by a first motor; and
      a second screw segment immediately adjacent to the first screw segment and connected to a second drive shaft concentric to the first drive shaft, the second drive shaft configured to be driven by a second motor independently of the driving of the first screw segment;
   a frame configured to hold both ends of the screw;
   a first shaft connector mounted to the frame and operably connected to the first motor;
   a first key affixed to an end of the first drive shaft and configured to connect with the first shaft connector in a single unique position in a rotation direction of the first drive shaft;
   a second shaft connector mounted to the frame and operably connected to the second motor; and
   a second key affixed to an end of the second drive shaft and configured to connect with the second shaft connector in a single unique position in a rotation direction of the second drive shaft.

7. The split shaft screw system according to claim 2, further comprising at least one composite plane bearing positioned between the first drive shaft and second drive shaft.

8. A method for conveying an article along a movement path and against a guide by using a screw having at least two screw segments which are independently drivable by a respective at least two concentric drive shafts, the screw further having a plurality of threads, each thread having a crest, a root and a pair of sidewalls, the method comprising:
   capturing the article between the root and pair of sidewalls;
   conveying the article by rotatably driving the at least two screw segments together at the same rate;

conveying the article by rotatably driving a single one of the at least two segments while the other of the at least two segments is slowed or stopped;

supporting both ends of the screw; and driving the at least two concentric drive shafts by a respective at least two motors, wherein the at least two motors are affixed to a frame at a same downstream end of the screw.

9. The method according to claim 8, further comprising rotating one of the at least two concentric drive shafts within another of the at least two concentric drive shafts.

10. The method according to claim 8, further comprising abutting the at least two screw segments against each other.

11. The method according to claim 8, further comprising:

increasing a thickness of the threads on one of the at least two screw segments downstream along the movement path;

maintaining as constant a thickness of the threads on another of at least two screw segments along the movement path.

12. The method according to claim 8, further comprising introducing the article into a rotatable starwheel housing at a downstream end of the screw.

13. The method according to claim 12, wherein the introducing of the article further comprises providing for one or more unfilled starwheel housings between articles introduced into the rotatable starwheel, by the conveying of the article by rotatably driving a single one of the at least two segments while the other of the at least two segments remains stopped.

14. A method for conveying an article along a movement path and against a guide by using a screw having at least two screw segments which are independently drivable by a respective at least two concentric drive shafts, the screw further having a plurality of threads, each thread having a crest, a root and a pair of sidewalls, the method comprising:

capturing the article between the root and pair of sidewalls;

conveying the article by rotatably driving the at least two screw segments together at the same rate;

conveying the article by rotatably driving a single one of the at least two segments while the other of the at least two segments is slowed or stopped;

providing a frame configured to hold both ends of the screw;

providing at least two shaft connectors mounted to the frame and operably connected to a respective at least two motors;

connecting a first key to an end of one of the at least two drive shafts to a respective shaft connector of at least two shaft connectors, the first key connectable in only a single unique position in a rotation direction of the screw; and connecting a second key to an end of another of the at least two drive shafts to a respective shaft connector of at least two shaft connectors, the second key connectable in only a single unique position in a rotation direction of the screw.

15. The method according to claim 9, further comprising providing at least one composite plane bearing between drive shafts of the at least two concentric drive shafts.

16. The method according to claim 8, further comprising, after the conveying the article by rotatably driving a single one of the at least two segments while the other of the at least two segments is slowed or stopped, resuming conveying the article by rotatably driving the at least two screw segments together at the same rate.

* * * * *